Patented Apr. 8, 1952

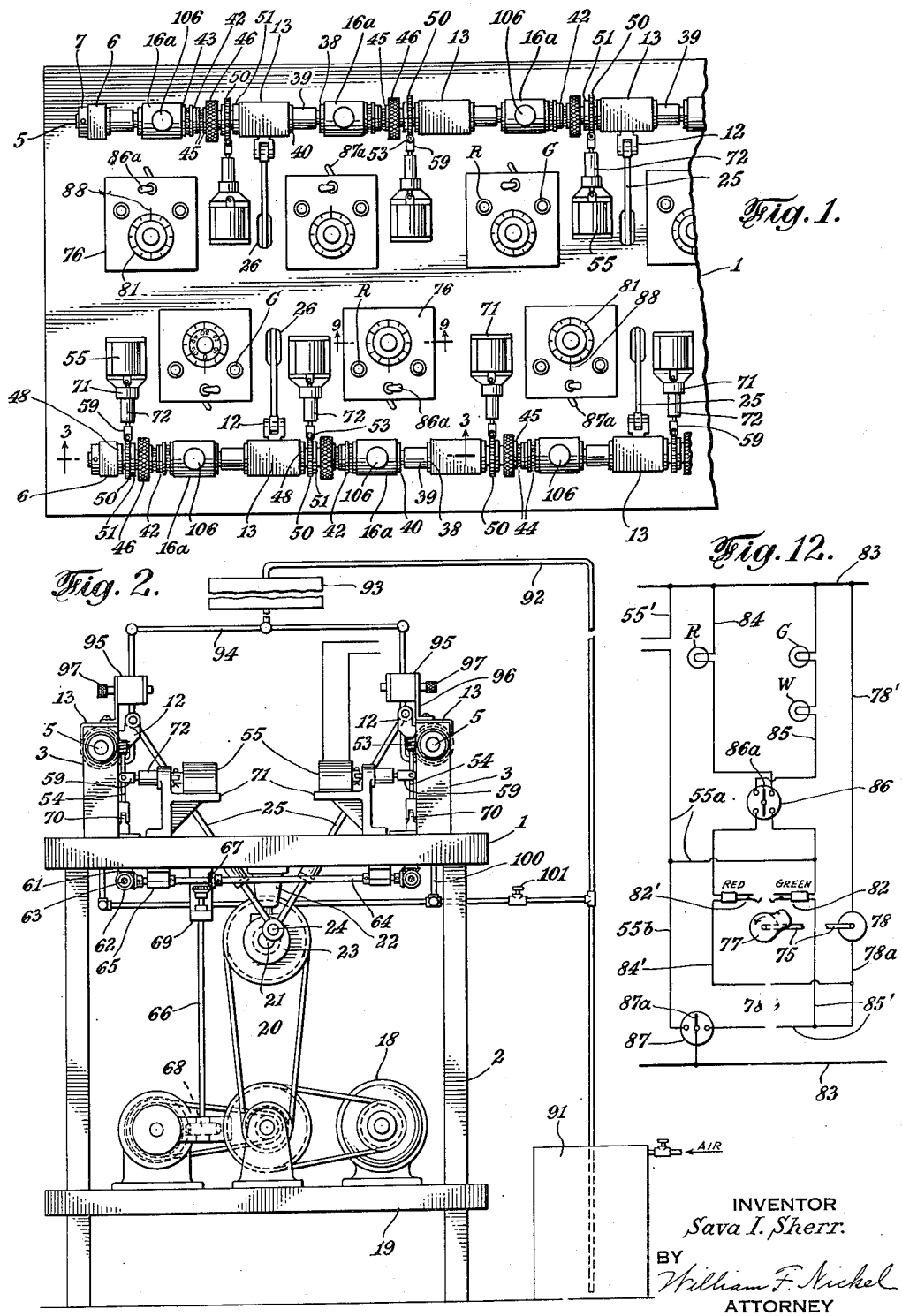

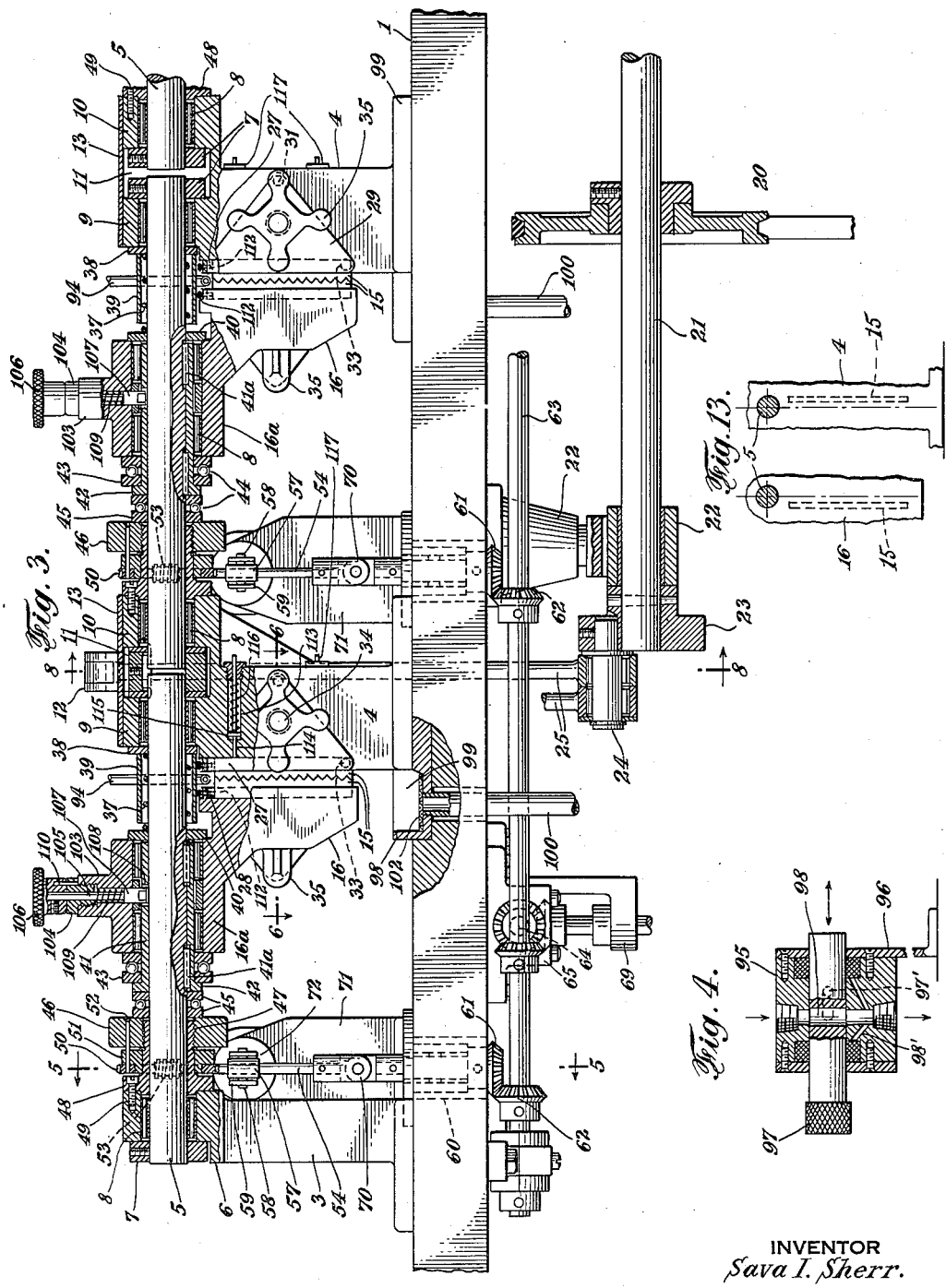

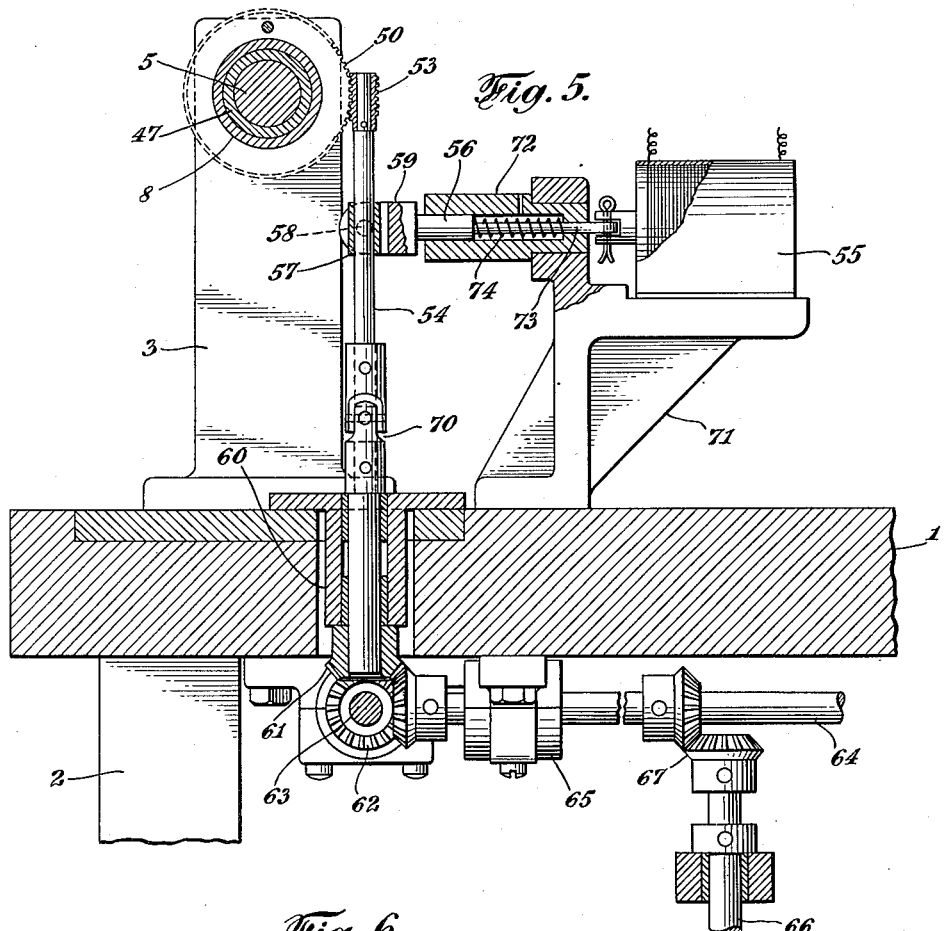
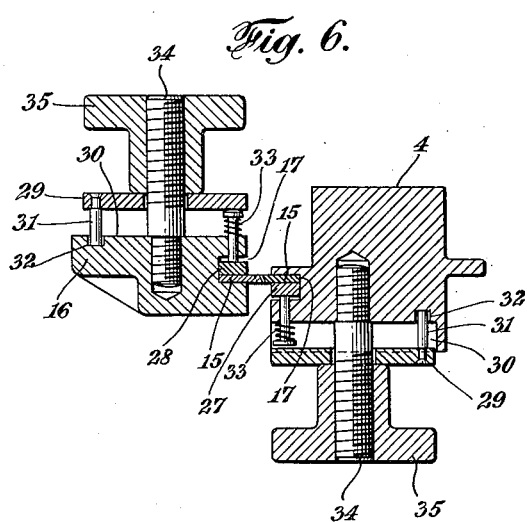
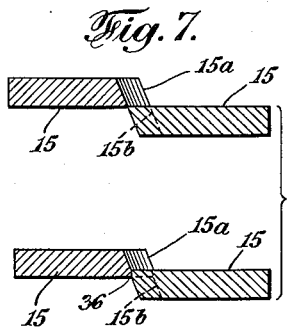

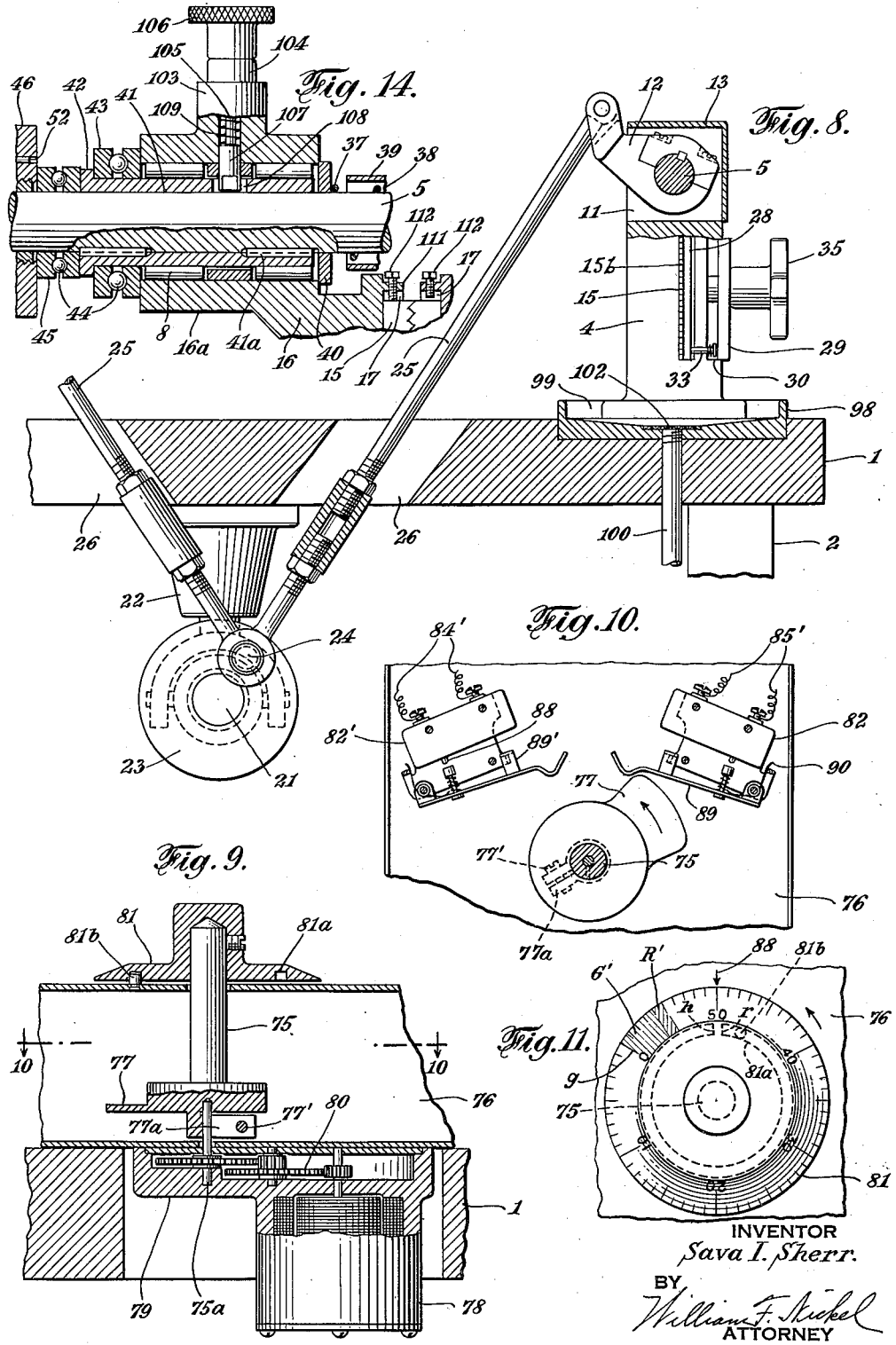

2,592,344

UNITED STATES PATENT OFFICE 2,592,344

APPARATUS FOR FINISHING TOOTHED CUTTING BLADES

Sava I. Sherr, New York, N. Y., assignor to Samuel Briskman, New York, N. Y.

Application January 30, 1948, Serial No. 5,444

3 Claims. (Cl. 51—26)

This invention is an improvement in methods and apparatus for turning out cutting blades for scissors or shears, and more particularly to an improved method and apparatus for the production of blades of shears for severing cloth so as to make a zigzag or serrated edge—generally called pinking—by an efficient process that yields a very superior tool part entirely ready for practical use; with much less work and labor and in less time than previously required.

Heretofore in the manufacture of pinking shears of the hand scissors type, several strips or flat bars of metal were made up into a bunch and secured together adjacent a rotary cylinder having pointer cutter elements on the exterior thereof; and said cylinder was revolved to carry said elements against one edge of each metal blank, said edges coinciding. The cutter elements were placed side by side, and had triangular pointed extremities, which cut into one edge to form the teeth; and each tooth had lateral faces converging to an edge that extended from one of the wide, flat sides of the blade to the other. The teeth thus had a triangular shape and projected along one edge of the blade. The blades then had to be "sheared" to some extent, that is, the sides of each tooth were cut, worn, or shaved away by hand along the leading or advancing edge, so as to form a small strip of surface along said edge that made a slight angle with the remainder of the lateral surface of the tooth. The blades were then "lapped," so as to impart to them (and especially to the narrowed sheared surfaces) the proper configuration to ensure smooth cutting by said teeth when the blades became part of a pair of pivotally united jaws and were moved bodily with respect to each other about the pivotal point, so that the teeth of one blade fitted the triangular spaces between the teeth on the other. These stages, however, constituted a somewhat prolonged and expensive series of steps, and the chief object of this invention is to provide a method and apparatus for manufacturing superior blades for shears of this type at a much lower cost and in a relatively shorter period.

Hereretofore in the performance of the lapping operation, it was first necessary for the blades to be visually inspected and paired off. Then, one blade of a pair was mounted in a movable arm of a lapping machine and its mate was mounted in a stationary arm. Each blade was partially clamped by means of three screws. It was then necessary that the blades be aligned, so that the tooth points of one blade exactly coincided with the tooth roots of its mate, and vice versa. To accomplish this, the operator manually reciprocated the movable arm, simultaneously feeding it towards the stationary arm, and thus oscillating one blade and advancing it relative to its mate. Due to the partial clamping, the blades were free to move (to a limited extent) and tended to align themselves with each other. To allow this movement, the machine could not be equipped with permanent stops for locating the blades, and therefore the final position of the blades relative to the center of oscillation of the movable arm was largely a matter of chance. Another object of this invention is to provide for positive positioning of the blades during lapping, in such a way as to provide a finished pair of blades with superior cutting action.

A further disadvantage in the previous arrangement for clamping the blades was the difficulty of applying identical pressure to all three clamping screws. This made alignment of the blades in the machine difficult, as either top or bottom of the blade would have a greater tendency to move dependent upon the clamping pressure exerted by the operater. Another object of this invention is to provide uniform clamping on both ends of the blade so as to make possible more accurate and more rapid alignment of the blades.

Lapping of shear blades is an operation which removes metal by the relative movement of one blade against another, with an abrasive compound flowing between the blades, and pressure being exerted by one blade on the other. The speed of lapping is in direct proportion to the pressure applied, whereas the fineness of finish is in inverse proportion to this pressure. There are practical limits to the pressure that may be used, and by experimentation, a most advantageous lapping pressure for the material used has been determined. Increasing pressure above this point results in a coarser finish on the blades, and an inferior shear; a decrease in pressure retards the speed of the operation. In lapping machines in use prior to this invention, the pressure was applied by means of forcing the shear blades together manually, through the medium of a screw thread. In practice, an operator was given several machines to run, and he would in succession tend each machine, first examining the blades to determine whether they were sufficiently lapped, and if not, then applying additional pressure, and passing on to the next machine. As removal of metal proceeded between a pair of blades, the amount of interference between them would diminish and the pressure would decrease, thereby retarding the lapping speed. It would often occur that due to delay of the operator in returning to a particular machine, the pressure would drop to nothing and the machine would continue to operate with no advancement being made in the finishing of the blades. It is therefore another object of this invention to provide constant lapping pressure, in order to secure the utmost despatch in finishing the blades, and then to gradually reduce the pressure to provide a fine finish on the faces thereof.

A further object is to provide an apparatus and a method that will lap and polish the toothed blades so quickly that preliminary grinding down or "shearing" of the leading edges of the teeth is not needed.

An additional object is to provide an apparatus for lapping in which the time of operation can be determined and selected beforehand, and which will be automatically stopped as soon as the prescribed interval expires.

These and more objects and advantages are made clear in the following specification and the novel features are pointed out in the appended claims. But the disclosure is explanatory or by way of example only, and in practice various changes in structural details and mode of operation can be adopted without deviation from the essential characteristics wherein the invention resides.

On the drawings:

Figure 1 is a top plan view showing the mechanism for realizing the objects of this invention.

Figure 2 is an end elevation thereof.

Figure 3 is an enlarged vertical section on line 3—3 of Figure 1.

Figure 4 is a section through a valve for regulating the flow of lapping compound.

Figure 5 is a vertical section on line 5—5 of Figure 3.

Figure 6 is a horizontal section on line 6—6 of Figure 3.

Figure 7 is a sectional detail showing two of the blades and the manner in which they are rubbed together for the lapping effect, presented in different positions.

Figure 8 is a vertical section enlarged, on line 8—8 of Figure 3.

Figure 9 is a vertical section on the line 9—9 of Figure 1, to show the time interval controlling attachment for the machine.

Figure 10 is a front view of the means for controlling an electric circuit for energizing said attachment, on the line 10—10 of Figure 9.

Figure 11 is a front view of the knob for setting said means.

Figure 12 is an outline of the electric supply circuit for said attachment.

Figure 13 shows the position the blades must occupy during the lapping operation.

Figure 14 is an enlarged section through the arm 16, substantially on the line 3—3 of Figure 1.

The apparatus containing my invention is mounted upon the top of a table or like support 1 having legs indicated at 2. On the table 1 are posts or standards 3 aligned with other posts or standards 4. Two rows of such standards are shown in Figure 1, but a different number can be utilized. The arrangement is such that in each row the posts or standards 3 are at the ends and as many posts or standards 4 as desired are in between the standards 3. Each row or group of standards 3 and 4 mounts several shafts 5, and these shafts are connected so that adjacent shafts in each row are rocked in pairs when the machine is operated, as will appear later. Only one end of each row of standards appears on Figure 1, but the other end is the same. I shall describe the pair of shafts adjacent one end of such a row of standards, these two shafts acting to lap one pair of shear blades each.

Referring to Figure 3, one shaft of the pair adjacent a post 3 is received at one extremity in a bearing 6 at the top of said post, this extremity having a collar 7 affixed thereon to hold the shaft against end-play. The bearing 6 on each post 3, and all the other bearings for the shafts 5, contain antifriction elements 8. Between the end standards 3, each of the standards 4 has a double bearing 9 and 10 at the upper end, the bearing 9 in the nearest standard 4 receiving the other end of the aforesaid shaft 5, as indicated in Figure 3, and the bearing 10, the adjacent end of the second shaft 5 of the same pair, to operate in unison with the first. In line with the pair of shafts shown in this figure are other pairs of similar shafts, one of which is mounted in the next post 4 at the extreme right of Figure 3. Each additional pair of shafts 5 is mounted, connected and operated in the same way as the pair that Figure 3 illustrates. On the standard 4 carrying the pair of shafts in Figure 3, the bearings 9 and 10 at the top are separated by a recess 11 into which the adjacent ends of both shafts of said pair project. The next post 4 at the extreme right of Figure 3 receives the end of said second shaft in one bearing 9, and this other or second shaft has a fixed collar 7 on its end in the recess 11 of said next post 4. The said post 4 mounts in its remaining bearing 10 a third shaft 5 which belongs to the next pair, and this third shaft has a similar fixed collar 7 in the recess 11 between the bearings 9 and 10 of said post. The shafts of the next pair have their adjacent ends supported in a third post, in the same manner as the two shafts at the left in Figure 3 and the remaining end of this second pair of shafts will be in either a bearing 9 of an additional post 4, or the bearing 6 of the post 3 at the opposite end of the row.

Each pair of shafts supported in line at the tops of one row or group of standards 3 and 4 is rocked by means of a crank 12 keyed to the extremities thereof in the recess 11 between the bearings at the top of the post 4 at the middle of the pair. The two bearings 9 and 10 and this recess are covered by a cap 13. The post 4 in question carries one of the toothed shear blades 15 to be processed by the apparatus, the other being held in an arm 16 which is rocked by the shaft 5. The other shaft of each pair also has an arm 16.

Each post 4 and the cooperating arm 16 have a vertical slot or cavity 17 (best shown in Figure 6) in which the blades 15 to be lapped are secured. The arm 16 swings the blade secured thereto past the other blade affixed to the adjacent post 4, so that the teeth of these two blades rub against one another. As shown in Figure 2, the oscillation of the shafts 5 is brought about by a motor 18 supported on a shelf or ledge 19 below the table 1. This motor is connected by reduction gearing indicated at 20 with a shaft 21 under the table parallel to the rows of standards, mounted in bearings 22 affixed to the table, and having for each two pairs of shafts 5 a crank disk 23 (see Figure 8). This disk has a crank pin 24 and this crank pin is connected by rods or links 25 to the cranks 12 for the shafts 5 at both sides of table 1. When the motor rotates, the shafts are thus oscillated. The links 25 pass through the openings 26 in the table 1.

Between each arm 16 and the associated post 4 which carries the stationary blade 15 is a spring 37 (see Figure 3) which bears against a washer 38 in contact with the bearing 9 on the post 4, and a similar washer 40 which surrounds the shaft and bears against the hub 16a of the arm 16. This spring is encircled by a sleeve 39 which encloses it. The spring tends to force the arm 16 against an antifriction element 43. The same shaft is surrounded by a sleeve or bushing 41 which is spaced from the washer 40 at one end and extends through the head or hub 16a. The sleeve is keyed at 41a on the shaft and terminates at the opposite end in a flange 42. Between this flange and the hub of the arm 16 are raceways 43 carrying antifriction rollers 44. On the opposite side of the flange 42 are similar raceways 45 with antifriction rollers between them. Adjacent the antifriction bearings 45 is a circular milled head 46 which is screwed upon the threaded end of a bushing 47 encircling the shaft 5. This bushing has a flange or collar 48 which is attached immovably to the adjacent fixed bearing 10 at the top of standard 4 and the bearing 6 of the end standard 3, by one or more screws 49. Adjacent the flange 48, this bushing 47 is smooth and is surrounded by a gear wheel 50 carried by a hub 51, both the wheel and the hub being connected to the head 46 by pins 52. The bushing 47 being held motionless by the screw 49, the rotation of the gear 50 will turn the head 46 so that the screw threads on the bushing 47 will cause this head to move to one side or the other lengthwise of the axis of the shaft 5. It is rotated so that it will press against the raceways 45 and gradually feed the sleeve 41 and arm 16 towards the standard 4 against the force of the spring 37.

Meshing with each of the gears 50 is a worm 53 (best shown in Figure 5) on an upright shaft 54, which includes a universal joint 70. This shaft passes down through the table 1 and can be swung sideways into and out of mesh with the gear 50. This is done by an electromagnet 55 which operates a plunger 56 and a sleeve 57 surrounding the shaft 54, and attached by trunnions 58 to the arms of a yoke 59 on the end of the plunger 56. Whenever the magnet pulls the plunger 56, the shaft 54 and the worm 53 are disengaged from the adjacent gear 50. The magnet 55 is mounted on a bracket 71 which has a bearing 72 for the plunger 56, the latter having a thin stem 73 pinned to the armature of the magnet 55. The bearing 72 contains a bore for the plunger 56, and the inner end of this bore is shouldered to serve as a seat for a spring 74 between this seat and the shoulder at the junction of the stem 73 and the plunger 56. The spring 74 tends to move the plunger outward and force the worm 53 to engage the gear 50. Thus, when current is supplied to the magnet 55, the shaft 54 pivots on its universal joint 70, pulling the worm 53 out of mesh with the gear 50. When the current supply to the magnet is discontinued, the action of the spring 74 causes the worm 53 to mesh with the gear 50.

The bearing 60 for the shaft 54 has at its lower end a bevel gear 61 which meshes with a bevel gear 62 on a shaft 63. There is a shaft 63 for each row of standards and shafts 5, running along under the table 1 (as shown in Figure 2). Each shaft 63 is operated by another shaft 64 with which it meshes through similar bevel gears at the ends, the shaft 65 being mounted in bearings 65 on the lower face of the table 1, and being driven from a vertical shaft 66 through the cone gears 67. The shaft 66 which is mounted in bearing 69 has at its lower end a speed reducing mechanism 68 also driven by the motor 18. As the motor rotates and the worms 53 engage the gears 50, the gears will turn and the arms 16 will be fed towards the associated posts 4, against the resistance of the springs 37, at a uniform rate of speed. The gears 61 are fast on shafts 54.

The arms 16, as above stated, are rotated through the sleeves 41 (see Figure 14), which are keyed to the shafts 5. The hub 16a of each arm has a hollow boss 103, in the outer end of which is a nut 104. Through the nut passes a stem 105 which has on the outer end thereof a milled head 106. At the inner end of the stem 105 is an enlarged foot 107 which is suitably shaped so as to closely engage an opening 108 in the sleeve 41. The foot has a shoulder, and surrounding the stem 105 with its ends engaging this shoulder and the nut 104, is a coiled spring 109. The spring holds the end 107 in the opening 108 of the sleeve 41 and makes the arm swing with the sleeve 41. The nut 104 has a pin or projection 110 (see Figure 3) extending from its outer face into a bore in the head 106 to receive it. The head, however, can be pulled until it clears this pin and then turned to carry the bore in it away from the pin. The stem 106 is then lifted and stays lifted, releasing the arm 16 from the sleeve 41.

A suitable abrasive liquid or lapping compound runs over the blades while the machine is running. It comes from the tank 91 (Figure 2) and can be forced by air pressure up through a pipe 92 to a receptacle 93 above the table 1, this receptacle being connected by branch pipes 94 to valve casings 95 adjacent each pair of blades. These valve casings 95 are mounted by means of brackets 96 on the posts 4 carrying the stationary blades 15. Each casing has a plug 97 (see Figure 4), with transverse duct 98 through it, so that by pushing the plug 97 the liquid can be shut off. The liquid runs down over the blades 15 and drips into a pan 99 (Figure 3) below each pair of shear blades, through a strainer 102, and this pan is connected by a return pipe 100 to the pipe 92 (Figure 2), to be returned to the receptacle 91. In the line of this pipe 100 is a stop cock 101 which is shut off when air is being pumped into tank 91, to insure that the compound goes up through the pipe 92 and not through the pipe 100. To prevent leakage of lapping compound pass the brackets 96 when plunger 97 is pushed forward or backward, a suitable oil seal is provided, as shown in Figure 4. Thus, any compound which is carried along by the movement of the plunger is stripped by the oil seal and is returned to the system through the angular ducts 98'.

In practice, the motor runs constantly, and by means of the pulleys, belting, connecting rods 26, and the cranks 12, continuously oscillates all the shafts 5. With the foot 107 of the pin 105 withdrawn from the slot 108, that is, with the arm 16 stationary, the blades are loaded into a machine by the operator. The knob 106 is then turned until the pin 110 enters the hole in the said knob 106, thereby engaging the step 107 with the hole 108, thus connecting the arm 16 to the oscillating shaft 5, imparting a rocking motion to the arm 16. The operator then engages the worm 53 with the worm wheel 50 by means subsequently described, and the arm 16 is thus simultaneously rocked and slowly fed axially toward the post 4. The operator then pulls the plunger 97 back allowing the lapping compound to flow over the blades. The blades are thus simultaneously rocked and fed toward each other, with lapping compound flowing between them.

The manner in which the blades are operated is indicated in Figure 7. The two blades present the teeth 15a and 15b toward each other, and the rubbing of these teeth as the arms 16 swing back and forth will wear away a small strip of surface indicated at 36 which runs along the side faces of the teeth or across the width thereof at the leading edges thereof. In the shears, these blades are so mounted that these strips of surface engage the material to be cut or severed. As the blades move closer together, more and more pressure is developed between them due to interference of one blade with the other. This pressure, in conjunction with the lapping compound causes removal of metal from each blade. It is thus evident that two conditions operate; first, the feeding forward of the blade tending to increase the pressure between them, and second, the removal of material, tending to decrease this pressure. After a short period of operation, these two conditions approach equality, that is, a pressure is arrived at through which the rate of stock removal is quantitatively identical with the infeed. From this point on, lapping is carried on at constant pressure.

When sufficient material is removed, the only remaining task is to acquire a fine finish. To accomplish this, the worm 53 is disengaged from the worm wheel 50, thereby discontinuing the feed. Thenceforth, the pressure drops off in proportion to the rate of stock removal from the blades, and it is evident that this rate of removal decreases gradually, eventually dropping off to zero, and thus providing a fine finish on the rubbing surface of the blades. At this point, the operator pulls up the knob 106, thereby uncoupling the arm 16 from the shaft 5, and then unloads and reloads the unit to reperform the operation with another set of blades.

The mechanism and operation of loading the blades will now be described.

In the recess 17 (Figure 6) for the shear blade 15 in each post 4 is a locking bar or element 27, and in the recess carried by the associated arm 16 is a similar locking bar 28 for the other blade, which is mounted on this arm 16. On the post 4 is a plate 29 mounted over a recess 30 in the outer face of this post. This plate carries a fixed pin 31 which loosely engages a hole 32 in the bottom of the recess 30. The plate bears upon headed pins 33 in small bores in the post and urges the pins 33 against the locking bar 27. Each pin 33 has a spring around it which tends to force it away from the bar 27. The post has a threaded stud 34 (which goes through a hole in the plate 29) on the outer end of which is a knob 35. When the knob is turned, it forces the plate 29 towards the recess 30, the pin 31 tilting slightly in the hole 32, and makes this plate press the pins 33 against the locking bar to hold the shear blade fast. Each rocker arm 16 carries a similar knob, plate and pins 33, and the shear blade carried by this swinging arm is held fast in the same way.

The blades 15 must be accurately located in the slots 17 of the posts 4 and the arms 16, with their ends at the exact distance from the axis of the shafts 5, this distance being the same as the distance for the same ends from the pivot in the shears which will carry these blades for cutting. For this purpose, each arm 16 has a projection 111 (Figure 14) at the end of the slot 17 nearest to the shaft 5, and this projection carries a small screw element 112. The bottom of this screw is a locating point against which the end of the blade abuts. The slot 17 in each post 4 has a somewhat similar projection 111 at one end carrying a screw element 112. This projection is set slightly closer to the shaft 5 than the projection in the arm 16, for reasons that will be made evident later. Each post or support 4 also has horizontal bores 113 (shown in Figure 3) which pass through the post from one side to the other into the slot 17 and have a reduced section which opens through the bottom of the slot in the post 4. This section presents an inside shoulder and the bore contains a pin 114 bearing a collar 115 which abuts this shoulder. A spring 116 surrounds this pin, engaging the shoulder, and a perforated nut 117 screwed into the large end of the bore 113. The purpose of the screw element 112 in the post 4 and the spring pressed pins 114 which project into the bottom of the slot 17 in the post 4 is to enable the blade 15 in the said slot to be adjusted so that its teeth will match perfectly with the teeth of the blade in the arm 16. The screw 112 on the post 4 is set back and does not project so far into the slot of the post 4 as the screw 112 for the slot in the arm 16. After one blade 15 is set and clamped in the arm 16, the complementary blade is inserted in the slot 17 of the post 4 in contact with the screw 112 and the ends of the pins 114. This blade is clamped only finger tight. The operator then oscillates the arm 16 by hand, simultaneously feeding the arm 16 inward by rotating the knob 46. (At this time the feed worm is not in engagement.) After a few oscillations, the blade 15 in the post 4 can thus be worked by the blade in the arm 16 into the right position. This blade in the post 4 thus works a little lengthwise in the slot 17, and it will be pushed by the spring-pressed pins 114 so that its teeth make contact with all of the teeth of the other blade. When the operator sees that the two blades are properly aligned, he tightens the knob 35 on the post 4 and the lapping can commence. The ends of the blades are thus spaced the same distance from the axes of the shafts 5 in lapping as from the axis about which they revolve when the teeth are cut, and this distance is naturally the exact distance of the ends of the blades from the axis of the pivot of the finished shears of which they ultimately form a part.

It is evident from the foregoing that by loading the blades and aligning them in any unit, throwing in the feed mechanism, and allowing the arm 16 to feed toward the post 4 for a predetermined length of time, and then disengaging the feed mechanism, a uniform and superior product results. It now remains to describe the device used for controlling this timing and for informing the operator that the desired result has been obtained so that no time is needlessly lost.

The energization of each magnet 55 is controlled by a corresponding cam 77 (Figure 9) on a spindle 75 mounted in a casing 76 suitably disposed on the table 1. The spindle 75 is in frictional engagement with a journal or pin 75a. The amount of frictional force in this engagement is fixed by means of a split projection 77a of the spindle 75 which carries a regulating screw 77′ (also shown in Figure 10). The frictional engagement is so adjusted as to ensure rotation of the spindle 75 with the pin 75a unless a positive force should stop the spindle, whereupon the pin 75a could slip within the projection 77a and continue to rotate. The pin 75a is the output shaft of a gear train 80, the input side being a constant speed motor 78. The speed of the motor is such as to produce a resultant rotation of the pin 75a of approximately one revolution per hour. The motor and gear train are together housed in a suitable casing 79.

Each spindle 75 has operating knob 81 on its end outside the casing 76. As shown in Figures 9 and 11, each knob 81 has a circular groove 81a on its inner face which is nearly, but not quite, endless, having two extremities r and h close together. The casing 76 bearing the knob 81 has a fixed stop 81b which enters this groove. Thus the knob can be turned through virtually a full circle to set it with the associated cam 77 so that the stop 81b is a predetermined distance from the appropriate end of the groove 81a. The distance between one end of this groove and the other prescribes the range through which this knob and the cam 77 can be turned.

From the foregoing, it is evident that 6° of rotation of the knob corresponds to one minute of elapsed time. The knob is therefore marked with lines at 6° intervals around the circumference. The zero line is set at an angle of 60° to the left of the end of the groove 81a, and an angle of 30° to the right of the zero line is marked with green paint. The pin 81b is so positioned as to halt the rotation of the knob when the right hand end of the green marking comes alongside an arrow 88 on the casing 76. For a short space to the right of the green sector, the knob is marked with red paint. The green and red markings are designated by G' and R' respectively in Figure 11.

Referring to Figure 10, 82 and 82' are two circuit closers, comprising an electric switch 88, an activating lever 89, and a spring 90. Upward pressure against the lever 89 closes the circuit, whereas abatement of pressure allows the spring 90 to return the lever downward, opening the circuit. The pressure is applied by the cam 77. The relationship between the closers 82 and 82', the cam 77, and the markings of the knob 81 is such that the closer 82 closes when the leading edge g of the green marking G' of the knob 81 is opposite the arrow 88, and similarly, the closer 82' closes when the red marking R' comes opposite the arrow. Further movement of the cam 77 is prevented at this point, since the edge h of the groove 81a hits the pin 81b. The motor 78 continues to rotate, but the journal 75a slips in the projection 77a. The lobe of the cam 77 is sufficiently broad to keep the closer 82 closed when the leading edge of the lobe closes closer 82'.

It is therefore evident that if the motor 78 is in constant operation, the knob 81 can be rotated clockwise by hand and set to any desired time marking (the journal 75a slipping in the projection 77a) and will then be rotated by the motor in a counterclockwise direction for the corresponding time, at the end of which closer 82 will trip; the knob will continue to rotate for 5 minutes (corresponding to the 30° sector of green marking) and will then trip the closer 82' and stop rotating until it is again forced clockwise by hand.

The wiring used in conjunction with this mechanism for energizing the magnets 55 is shown in Figure 12. There are shown the two circuit closers 82 and 82', their terminals joined by wiring to electric supply leads 83. The conductor 84 runs through a red light bulb R to a double-pole double-throw switch 86, and from there to the circuit closer 82'; and a similar wire 84' connects this circuit closer 82' to the other supply lead 83 through the right hand terminal of a single-pole double-throw switch 87. Another conductor 85 runs from one supply lead 83 to a white and a green lamp W and G, then to the switch 86 and by way of a conductor 85' to the other circuit closer 82 and to the other supply lead 83 by way of the aforementioned right hand terminal of switch 87. The wire 55' joins one lead 83 to the magnet 55, the circuit through the magnet being completed by conductor 55a, which is joined to the wire 85' between the circuit closer 82 and the switch 86.

The wire 55a is also connected by a wire 55b to the left hand terminal of the switch 87. For the motor 78, the circuit is from the lead 83 by way of conductors 78' and 78a to the conductor 85'. The green and red lamps are signal lamps, while the lamp W is mounted near the blades to illuminate them for inspection. The switches 86 and 87 are such that they are never open, being provided with springs to hold the movable members 86a and 87a in closed position to one side or the other.

The effect of the above electrical arrangement will now be described.

With the switch 87 thrown to the right (which is its normal operating position) the motor 78 operates. When the knob 81 has its numbered sector alongside the arrow 88, the knob rotates, the closer 82 is open, and the magnet 55 is not energized, therefore the worm 53 is in mesh with the worm wheel 50, and the blades feed towards each other. When the knob 81 has its green sector alongside the arrow, the knob rotates, the closer 82 is closed, energizing the magnet 55 and stopping the feed of the blades. If the arm 86a of the switch 86 is in the position from upper left to lower right (hereinafter referred to as position 1), the green and white lights are on. With the switch arm 86a in the alternate position (hereinafter referred to as position 2), these lights are off. When the knob 81 has its red sector alongside the arrow, the rotation of the knob ceases (due to the slippage described heretofore), both closer 82 and 82' are closed, and the magnet 55 is energized, the blades not being fed. With the switch arm 86a in position 1, the green and white lights are on. With the switch arm in position 2, these lights are off, but the red light is on.

Should the switch 87 be thrown to the left, the motor 78 stops, and the magnet 55 is energized, stopping the feed of the blades. This occurs irrespective of the position of any of the other controls.

It should be noted that during lapping, the abrasive compound flows over and completely covers the teeth of the blades. If the lapping compound is shut off by means of the plunger 97, the strips 36 (Figure 7) of the blades rub against each other, and the compound, after a few strokes, is wiped off them. However, the compound continues to adhere to the surfaces 15a and 15b. If at this time the blades are illuminated by the lamp W, the width of the strip 36 can be seen by the operator, since the oily surfaces 15a and 15b catch the light, whereas the dry surfaces 36 do not. Thus, by means of the light W and the plunger 97, the operator can inspect the amount of surface lapped on the blade and determine whether further lapping is necessary.

The normal operation of the machine by the operator is now described. The switch arm 87a of the switch 87 is always in the right hand position while the machine is in operation. It is thrown to its alternate position only should the unit require unroutine attention, or in the event of an emergency, and then it would disengage the feed and suspend operation of the timing device until operation of the particular unit could be resumed.

Normally, the operator removes a pair of finished blades from the machine and simultaneously loads a new pair. Thus, as will be evident from the following, when the operator approaches a unit for the purpose of unloading and reloading, the controls are in the following position. The knob 81 has its red sector adjacent the arrow 88. The switch arm 86a is in position 2. Thus, the feed is disengaged, and the red light is on. The red light is the visual signal that informs the operator that the blades are completed.

(1) The operator turns back the knob 46 to its back position, separating the blades.

(2) He pushes in plunger 97, stopping the flow of lapping compound.

(3) He pulls up knob 106 stopping the oscillation of the blade.

(4) He loosens knob 35 on arm 16 and removes one blade.

(5) He inserts a new blade and reclamps it.

(6) He loosens knob 35 on post 4 and removes the other blade.

(7) He then inserts another blade and aligns it as described previously.

(8) He re-engages knob 106, starting arm 16 oscillating.

(9) He pulls plunger 97 to start the flow of lapping compound.

(10) He turns knob 81 clockwise and sets it for the correct lapping time, thus engaging the feed.

(11) He throws arm 86a of switch 86 to position 1.

Lapping is now commenced and the operator is free to tend the next machine requiring his attention.

After the prescribed interval has elapsed, the green sector of the knob 81 reaches the arrow. The feed disengages, the blades are illuminated and the green light goes on (due to the prepositioning of switch 86a in step 11), thereby signalling the operator.

(12) He pushes plunger 97 and inspects the strip 36 of the blades. If the strip is of sufficient width,

(13) He throws arm 86a of switch 86 to position 2, throwing off the green and white lights. He is then free to work on any other unit requiring his attention. The blades continue to oscillate, but with no feed, the pressure between them drops off until, after five minutes, the lapping effect is negligible, and, due to the gradual decrease in pressure, the finish on strip 36 is extremely smooth and uniform. This operation is referred to as "running out" the blades. Then the red sector of the knob 81 reaches the arrow 88 and the red light goes on (due to the prepositioning of switch 86 in step 13). The condition is now identical with that in step 1, and the cycle is repeated with another set of blades.

If, after step 12, the operator decides that additional lapping is required, he manually rotates the knob 81 to set the required additional lapping time and the condition is identical with that encountered after step 11.

Should the operator not give prompt attention to a green light, the feed is nevertheless disengaged and the blades proceed to "run out." If the operator then performs step 12, no time is lost unless further lapping is required. If more than 5 minutes elapse between the lighting of the green light and the performance of step 13, the red light simply goes on as soon as the operator throws the switch 86, which indicates that the blades are completed. Should the operator not give immediate attention to a red light, no damage is done, as no further lapping is performed on the blades.

The machine can of course be made in various large sizes to process a large number of blades at once. The machine comprises several units, each of which contains enough shafts 5 with rocking connections for working eight pairs of blades at one time. The arm 16 of any one pair can be released from the shaft 5 carrying it so that the two blades can be removed and replaced while the arms of all the other seven pairs of blades continue in operation.

The casings 76 containing the cams 77 and bearing the shafts 75 and the knobs 81 can be disposed in any suitable position, either laid flat on the table 1 or in vertical position; mounted, if need be, on legs which support them higher than the two lines of shafts 5.

As set forth in my application Serial No. 681,257, for a patent on a Machine for Manufacturing Toothed Shear Blades, filed July 3, 1946, which issued as Patent No. 2,537,164 on January 9, 1951, the lateral faces of the triangular teeth 15a and 15b are elements of conical surfaces, all of which have a common axis which is situated adjacent one end of each blade and extends transversely of the wide flat faces thereof. This shape is imparted to the teeth because the blades are mounted in the face of a rotatable disk in such position that they extend outward toward the circumference, but are not quite in radial positions. The strips or blanks of metal to be cut to make the blades are also tilted sideways slightly in their seats on this disk, and they are revolved by the disk past the pointed ends of a row of cutters placed side by side. These cutters slice away the metal from the edge of the disk to form the teeth; and because the blades are tilted somewhat, the lateral faces of the teeth are inclined as shown in Figure 7. The inclination of these teeth, however, need not be more than 10°. It will be noted by reference to Figure 3, that as each pair of blades 15 is worked, one of them swings about the axis of the shafts 5 and the other is stationary but similarly placed with respect to the same axis. The blades are both supported in the arms 16 and the posts 4 in the same non-radial positions with respect to the axis of the shafts as in the machine of my said copending application (see Figure 13). The lateral faces of the teeth thus swing in a small arc and the lapping away of the faces would also tend to make these lateral faces of the teeth elements of conical surfaces if they already did not have such a shape. The previous cutting of the teeth in a manner that makes the lateral faces thereof small elements of conical surfaces in the first place, renders lapping easier and shorter and produces the small strips 36 along the acute or leading edges of the teeth in much less time. It also finishes said edges of these teeth so well that they conform perfectly when mounted in a pair of shears, and the previous separate step of shearing the faces of the teeth along their acute or leading edges before lapping becomes unnecessary. In the finished shears the blades are so mounted that they have the same position with respect to the pivot connecting the two halves or jaws of the shears as they sustain to the shafts 5 during lapping.

Having described my invention, what I believe to be new is:

1. Apparatus of the kind described, comprising a standard having a bearing with a shaft therein, and means for holding a cutter blade with teeth in fixed radial position with respect to said shaft, a hub carrying an arm on the shaft, gearing to oscillate the shaft, said arm having means for holding a second blade with teeth adjacent the first blade with the ends of said blades substantially in alinement, and the teeth on one blade in position to make rubbing contact with the teeth on the other as the shaft oscillates, a sleeve in said hub keyed to the shaft and slidable thereon, means for connecting the sleeve to the hub, resilient means engaging the standard and one end of the sleeve tending to push the sleeve away from the standard, a threaded bushing encircling said shaft and means mounting the bushing on the standard in fixed position adjacent the opposite end of the sleeve, a head having threaded engagement with the bushing, a gear secured to the head, a second shaft having a gear engaging the gear on the head and turn the head to move the sleeve, the hub and the arm to feed the blades towards each other during oscillation of the first shaft, means adjacent the standard mounting the second shaft to move laterally to effect disengagement of said gears, a magnet having an armature connected to said second shaft and said magnet having electrical connections to energize the magnet and attract the armature electrical connections to swing the last-named shaft to disengage the gears when the working of the blades is finished.

2. Apparatus of the kind described, comprising a standard having a bearing with a shaft therein, and means for holding a cutter blade with teeth in fixed radial position with respect to said shaft, a hub carrying an arm on the shaft, gearing connected to said shaft to oscillate the shaft, said arm having means for holding a second blade with teeth adjacent the first blade with the ends of said blades substantially in alinement, and the teeth on one blade in position to make rubbing contact with the teeth on the other as the shaft oscillates, a sleeve in said hub keyed to the shaft and slidable thereon, means for connecting the sleeve to the hub, resilient means engaging the standard and one end of the sleeve tending to push the sleeve away from the standard, a threaded bushing encircling said shaft and means mounting the bushing on the standard in fixed position adjacent the opposite end of the sleeve, a head having threaded engagement with the bushing, a gear secured to the head, a second shaft having a gear engaging the gear on the head and turn the head to move the sleeve, the hub and the arm to feed the blades towards each other during oscillation of the first shaft, means adjacent the standard mounting the second shaft to move laterally to effect disengagement of said gears, a magnet having an armature connected to said second shaft and said magnet having electrical connections to energize the magnet and attract the armature electrical connections to swing the last-named shaft to disengage the gears when the working of the blades is finished, the means on said standard and said arm for holding the blades comprising longitudinal slots and means for adjustably retaining the blades in said slots.

3. Apparatus of the kind described, comprising a standard having a bearing with a shaft therein, and means for holding a cutter blade with teeth in fixed radial position with respect to said shaft, a hub carrying an arm on the shaft, gearing to oscillate the shaft, said arm having means for holding a second blade with teeth adjacent the first blade with the ends of said blades substantially in alinement, and the teeth on one blade in position to make rubbing contact with the teeth on the other as the shaft oscillates, a sleeve in said hub keyed to the shaft and slidable thereon, means for connecting the sleeve to the hub, resilient means engaging the standard and one end of the sleeve tending to push the sleeve away from the standard, a threaded bushing encircling said shaft and means mounting the bushing on the standard in fixed position adjacent the opposite end of the sleeve, a head having threaded engagement with the bushing, a gear secured to the head, a second shaft having a gear engaging the gear on the head and turn the head to move the sleeve, the hub and the arm to feed the blades towards each other during oscillation of the first shaft, means adjacent the standard mounting the second shaft to move laterally to effect disengagement of said gears, a magnet having an armature connected to said second shaft and said magnet having electrical connections to energize the magnet and attract the armature electrical connections to swing the last-named shaft to disengage the gears when the working of the blades is finished, the means for connecting the sleeve to the hub comprising a spring-engaged pin carried by the hub, and the sleeve having a recess to receive the end of the pin.

SAVA I. SHERR.

REFERENCES CITED

The following references are of record in the file of this patent:

UNITED STATES PATENTS

| Number | Name | Date |
|---|---|---|
| 1,048,059 | Foppiano | Dec. 24, 1912 |
| 1,187,753 | Lumsden | June 20, 1916 |
| 1,214,423 | Casper | Jan. 30, 1917 |
| 1,217,608 | Kayetan | Feb. 27, 1917 |
| 1,826,482 | Rummel | Oct. 6, 1931 |
| 1,959,190 | Wyner et al. | May 15, 1934 |
| 1,959,900 | Brown | May 22, 1934 |
| 1,981,935 | Weidaner | Nov. 27, 1934 |
| 2,119,104 | Hirth | May 31, 1938 |
| 2,175,086 | Mitchell | Oct. 3, 1939 |
| 2,204,293 | Beaver | June 11, 1940 |
| 2,286,874 | Schwartz | June 16, 1942 |
| 2,313,970 | Roderick | Mar. 16, 1943 |
| 2,317,147 | Keen | Apr. 20, 1943 |
| 2,359,969 | Carson | Oct. 10, 1944 |

FOREIGN PATENTS

| Number | Country | Date |
|---|---|---|
| 463,922 | France | Dec. 30, 1913 |